US006976033B2

(12) United States Patent
Yang et al.

(10) Patent No.: US 6,976,033 B2
(45) Date of Patent: Dec. 13, 2005

(54) PRODUCTION CELL INFORMATION SYSTEM BASED ON ACTIVITY COSTS AND AN ARCHITECTURE THEREFOR

(75) Inventors: Hao-Ching Yang, Tainan (TW); Hao-Lun Lee, Hsin Tien (TW)

(73) Assignee: Charming Systems COrpration, Tainan (TW)

(*) Notice: Subject to any disclaimer, the term of this patent is extended or adjusted under 35 U.S.C. 154(b) by 492 days.

(21) Appl. No.: 10/120,218

(22) Filed: Apr. 10, 2002

(65) Prior Publication Data
US 2003/0195646 A1 Oct. 16, 2003

(51) Int. Cl.[7] ............................ G06F 17/00; G06F 7/00
(52) U.S. Cl. ...................... 707/104.1; 700/96; 700/108
(58) Field of Search ................ 700/95–116; 707/1–10, 707/100–104.1

(56) References Cited

U.S. PATENT DOCUMENTS

| | | | |
|---|---|---|---|
| 6,199,139 B1 * | 3/2001 | Katayama et al. .......... 711/106 |
| 6,303,395 B1 * | 10/2001 | Nulman ........................ 438/14 |
| 6,408,220 B1 * | 6/2002 | Nulman ...................... 700/121 |
| 6,456,894 B1 * | 9/2002 | Nulman ...................... 700/121 |
| 6,730,604 B1 * | 5/2004 | Liu et al. .................... 438/694 |
| 6,775,584 B1 * | 8/2004 | Huang et al. ............... 700/121 |
| 6,778,879 B2 * | 8/2004 | Chang et al. ............... 700/223 |
| 6,789,079 B2 * | 9/2004 | Chang et al. .................. 707/10 |
| 2003/0125972 A1 * | 7/2003 | Luce et al. ...................... 705/1 |
| 2004/0115842 A1 * | 6/2004 | Liu et al. ...................... 438/14 |
| 2004/0187137 A1 * | 9/2004 | Huang ......................... 719/316 |

OTHER PUBLICATIONS

Umeda, S. "A Manufacturing-Oriented Simulation Package to Support Systems Planning and Its Operation", Proceedings of the 1992 Winter Simulation Conference, Dec. 1992, pp. 890-898.*
Sematech "Computer Integrated Manufacturing (CIM) Framework Specification, Version 2.0", Jan. 31, 1998.*
Baliga, J. "MES and CIM: At the Center of Productivity", Semiconductor International, downloaded from www.reed-electronics.com/semiconductor, Jul. 1, 1998.*
McIlvaine, B. "IBM Unveils New MES That's Compliant with CIM Framework, Object Standards", Silicon Strategies, downloaded from www.siliconstrategies/sbn, Jul. 12, 1999.*

(Continued)

Primary Examiner—Luke S Wassum
(74) Attorney, Agent, or Firm—Thomas, Kayden, Horstemeyer & Risley (57) ABSTRACT

The present invention discloses a production cell information system based on activity costs and an architecture therefore. The present invention allows a plurality of production cells to execute most of the functions originally existing in the conventional MES (Manufacturing Execution System). The present invention not only can effectively overcome the shortcomings of centralized MES, but also can let each production cell collect and display its production information according to its characteristics. Furthermore, the present invention performs a cost evaluation based on all the activity costs spent on each production cell, so as to evaluate the performance of each production cell, and meanwhile, the related personnel is informed in time for achieving the objectives of profit center and consistently improving the production efficacy. According to the present invention, the production cell information system comprises: a cell controller, an equipment manager, a data service means and a web server. The architecture of the present invention for the production cell information system comprises: a presentation layer, a business rules layer, a data object service layer and an entity layer.

12 Claims, 6 Drawing Sheets

OTHER PUBLICATIONS

Applied Materials "Increasing Overall Equipment Effectiveness (OEE) in Fab Manufacturing By Implementing a Next-Generation Manufacturing Execution System—MES II", Jul. 1999.*

Barkmeyer, E. et al. "NIST Response to MES Request for Information", Dec. 6, 1999.*

Davis, A. et al. "New Operator Interface for the Poseidon Manufacturing Execution System", 1999 Systems Engineering Capstone Conference—University of Virginia, 1999, pp. 55-60.*

IBM "SiView Standard—IBM's Answer of Next Generation MES", downloaded from cimlab.ie.nthu.edu.tw/auto/text/class6$_{13}$SiView.pdf, 1999.*

Cheng, F-T. et al. "Modeling and Analysis of Equipment Managers in Manufacturing Execution Systems for Semiconductor Packaging", IEEE Transactions on Systems, Man, and Cybernetics—Part B: Cybernetics, vol. 30, No. 5, Oct. 2000, pp. 772-782.*

"Manufacturing Execution Systems: A Concept Note", TATA Consultancy Services, Feb. 2002.*

Applied Materials "Factory Integration Framework, Factory Control and Manufacturing Execution System (MES) Solution", 2003.*

Qiu, R.G. and M. Zhou "Mighty MESs: State-of-the-Art and Future Manufacturing Execution Systems", IEEE Robotics & Automation Magazine, vol. 11, No. 1, Mar. 2004, pp. 19-25, 40.*

McClellan, M. "Introduction to Manufacturing Execution Systems", Collaboration Synergies Inc., undated.*

* cited by examiner

PRODUCTION CELL INFORMATION SYSTEM BASED ON ACTIVITY COSTS AND AN ARCHITECTURE THEREFOR

FIELD OF THE INVENTION

The present invention relates to a production cell information system and architecture therefor, and more particularly, to a production cell information system based on activity costs and architecture therefor.

BACKGROUND OF THE INVENTION

With the rapid development of economics and increasingly diversified market demands, users have been asking for better quality and performance of products, and meanwhile, also for shortening the production cycle time. Therefore, the production techniques have to be developed for meeting the requirements of more varieties, smaller lot size, and larger lot quantity, which satisfy the entire manufacture requirements merely with one cycle. The modern manufacturing techniques not only have to be highly flexible and be able to satisfy the quality and quantity requirements, but also have to own novel production modes capable of facing the fast market changes. It is perceivable that the future manufacturing system must be a flexible manufacturing system which can achieve the objectives of smart manufacturing, virtual manufacturing and quick response to customer's needs.

Since an IC fabrication involves complicated manufacturing steps, expensive processing equipments, numerous product varieties and short product life cycles, IC makers have to apply computer integrated manufacturing (CIM) procedures for properly utilizing all kinds of manufacturing resources by controlling material and information flows. The so-called CIM is centralized with a database system by means of computers, and then through a computer networking, passes the information stored in the database to users speedily, or integrates various automatic facilities into an integrated automatic production system. In January 1997, from an article in Semiconductor International Journal, it is reported that "the installation of a CIM system is mission-critical in the start-up of new fabs and in the on-going development of current ones", wherein MES (Manufacturing Execution system) is the core of CIM.

A MES is a real-time online computer system integrating all kinds of information related to the production procedures, and the MES comprises the functions of: data collection; scheduling and inventory control; lot control; workflow control; tracking of work in process (WIP); equipment data management; recipe management; alarm and event management and maintenance management, etc. The MES can assist manufacturers (such as IC makers) to collect on-site data, and to convert the data into useful information for controlling and managing the production site, thereby achieving the goals of automatic management and maximum efficiency for a factory. Currently, there are several commercial MES brands used for monitoring a factory site. For example, those specialized in the application of IC factory are SiView made by IBM (International Business Machines) for specializing in the application of IC factory, and Factory Works made by Brooks Automation, etc. The functions of the aforementioned MESs covers the areas from collecting data, displaying information, analyzing information, to subscribing and generating reports, such as collecting equipment data (for example, material usage, equipment unit production and parameter settings, etc.); uploading/downloading process recipes; statistically calculating and reporting alarm messages; collecting process information and transmitting the information to an SPC (Statistical Process Control) system for performing a process status analysis; real-time monitoring current equipment situations (for example, working mode, pending mode, maintenance mode or shutdown mode, etc.); and simultaneously monitoring equipments of different model numbers, etc.

Figure 1:
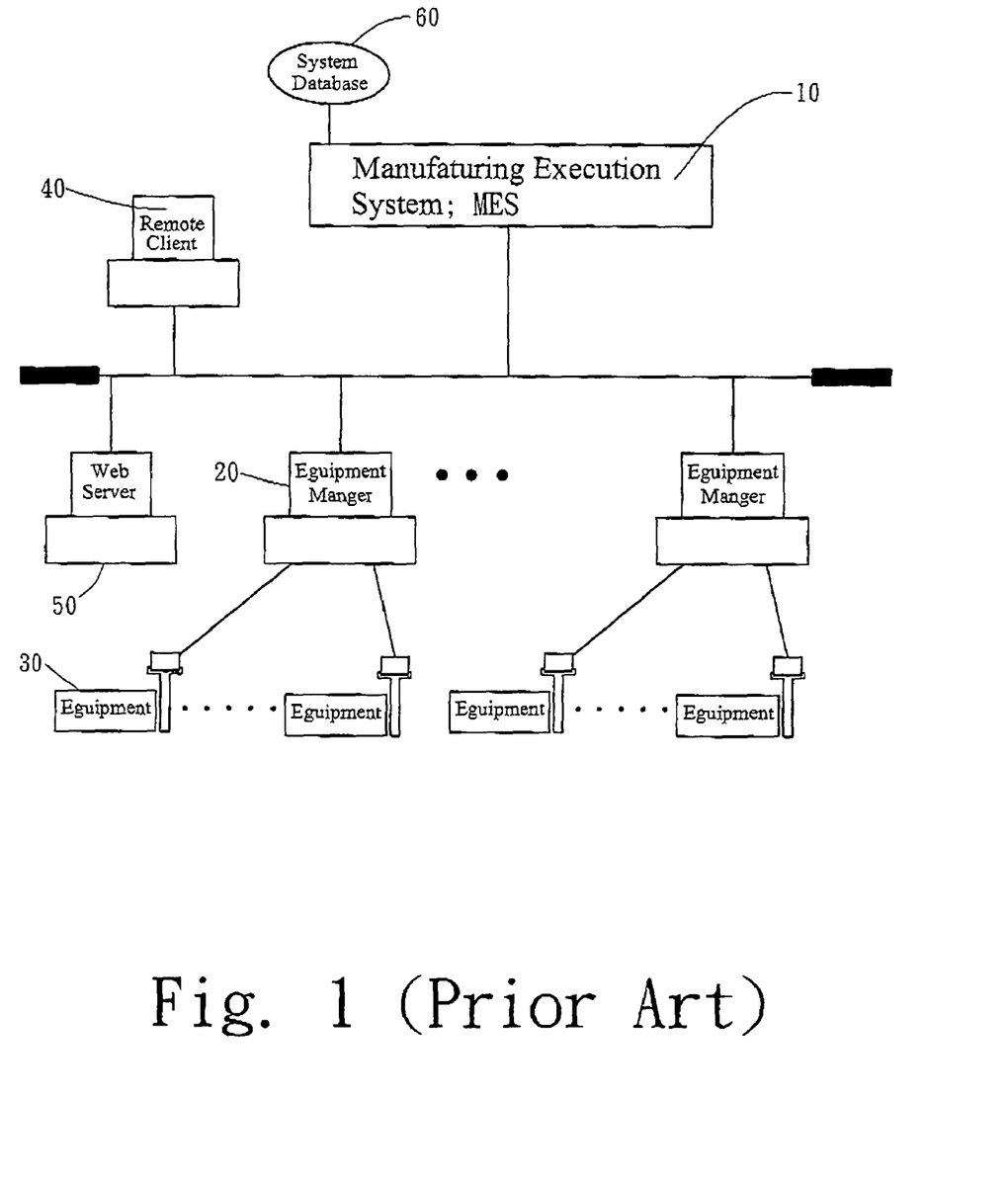
FIG. 1 is a schematic diagram showing the operation of a conventional MES.

Referring to FIG. 1, FIG. 1 is a schematic diagram showing the operation of a conventional MES, wherein the MES 10 monitors a plurality of equipment managers 20, and each of the equipment managers monitors a plurality of equipments 30. The MES is responsible for executing most of the procedures, and also stores all the information to a system database 60. After an equipment manager 20 receives a command from the MES 10, the equipment manager then orders the equipments 30 to start making production. The MES 10 is also equipped with a web server 50, so that a remote client 40 can access the information through a web browser. However, since the software system of MES 10 is quite huge, and each of the equipment managers usually controls and monitors dozens or up to hundreds of equipments 30, the aforementioned MES 10, which is a centralized system used for executing most of the procedures and information, is very likely to cause the following shortcomings, wherein: execution speed would be slow down due to the MES traffic jam; certain procedures, such as lot control, cannot be executed until the information from all equipments 30 has been collected, received, and approved by the MES 10, and thus the report regarding the deficiency of each of the production cells is delayed and the necessary decisions for objectives cannot be made; the equipments 30 cannot be effectively monitored and managed from the remote ends, since the web server have been hooked up to the MES 10.

Figure 2:
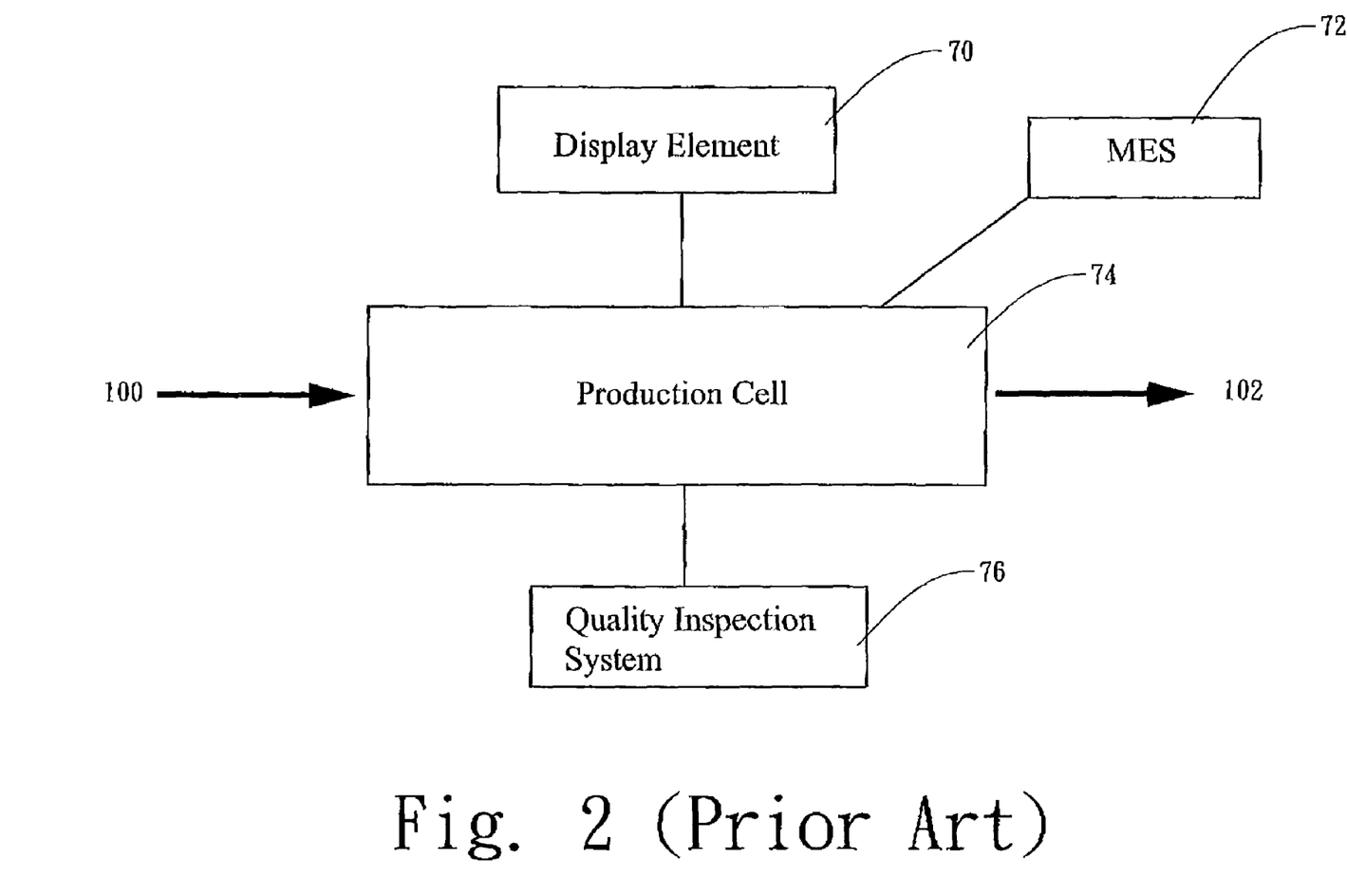
FIG. 2 is a schematic diagram showing the relationship with regard to material flow and information flow in the conventional MES.

Referring to FIG. 2, FIG. 2 is a schematic diagram showing the relationship with regard to material flow (such as material in and product out) and information flow in the conventional MES, wherein, after all parameters and data are set in a MES 72, material 100 is inputted into a production cell 74 for manufacturing and outputting a product 102. Thereafter, major but simplified kinds of production information are sent to a quality inspection system 76 for performing the operation of quality control, and also displayed on a display element 70 (such as a bulletin board or displaying board). Because the information flow in the conventional MES architecture has to cross over multiple departments inside a factory, so that the operation of quality control must costs more extra effort, and further it is very ineffective for the onsite or direct personnel to obtain the information regarding the actual production efficiency. Besides, the conventional MES is hard to execute the activity-based production cost analysis/evaluation in shop floor. For executing such of cost analysis/evaluation, the information has to be collected first and then batch sent to a financial or accounting department inside the company for completing cost analysis/evaluation in period, that have failed to reflect the cost and efficacy of each of the production cells in time. Moreover, the objective-oriented indicators usually cannot be computed until the cost analysis/evaluation is completed. Hence, the manufacturing process cannot be improved in time, which has a considerable influence on the production capacity, yield, and cost, etc.

It is deserved to be mentioned that: for all kinds of industrial production modes have been developed toward the target of small quantity with many varieties, the related production techniques have also stressed on quick response to customer's needs and accurate delivery time, thereby wining orders and promoting competitiveness, and enabling the production capacity and process techniques to meet market demands. Therefore, it is necessary to resolve the aforementioned shortcomings of the conventional MES and its architecture as soon as possible.

Hence, there is a urgent need to develop a production cell information system and an architecture therefore, so as to overcome the disadvantages of the conventional MES and its architecture, and meanwhile to effectively satisfy the overall enterprise needs, such as financial reports, operation improvements, efficacy evaluation, inventory control, production planning, engineering design, order handling and customer relationship management, etc.

SUMMARY OF THE INVENTION

According to the aforementioned background of the present invention, since the software structure of the conventional MES is quite huge, and the conventional MES uses a centralized architecture, wherein most of the procedures and information are handled and stored solely by a MES. This type of executions all performed in one system has caused a few disadvantages, such as the bottleneck of handling speed; failing to let on-site personnel be aware of the defects of production cell, and failing to effectively control the equipment from remote ends, etc.

Hence, it is an object of the present invention to provide a production cell information system based on activity costs, and an architecture therefor. The present invention enables the production cell information system integrated with an equipment manager to perform most of the functions originally existing in the conventional MES, thereby effectively distributing the executions and resolving the problem of execution speed bottleneck caused by the conventional MES.

It is also an object of the present invention to provide a production cell information system based on activity costs and an architecture therefor. For each production cell, the present invention uses resource and activity costs as a base to compute multiple indicators and to do the cost and effect evaluation, thereby modifying production strategies and laws in time, so that the production capacity, yield, and cost can be efficiently promoted.

It is further an object of the present invention to provide a production cell information system based on activity costs and an architecture therefor. The present invention installs a web server on every production cell, so that users on the client ends can access the inquired information from web browsers, and also the on-site or direct personnel can obtain the first-hand production information promptly.

According the aforementioned objects of the present invention, the present invention thus provides a production cell information system based on activity costs and an architecture therefor. According to the present invention, the production cell information system based on activity costs comprises: a cell controller; an equipment manager, a data service means; and a web server. The cell controller comprises: a lot control subsystem; a workflow control subsystem; an objective control subsystem; a WIP tracking subsystem; an equipment data management subsystem, a recipe management subsystem; an alarm event management subsystem and a maintenance management subsystem. The cell controller further comprises a function of cost evaluation. The equipment manager further comprises: a configuration control subsystem and a plurality of equipment drivers. The data service means further comprises: a local database and an objective database. The web server further comprises a web service subsystem.

Furthermore, according to the present invention, the architecture for the production cell information system based on activity costs comprises: a presentation layer; a business rules layer; a data object service layer; and an entity layer. The architecture of the present invention is used for building the production cell information system based on activity costs.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

The present invention discloses a production cell information system based on activity costs and an architecture therefore. The present invention first divides a real factory controlled by the large centralized MES into a plurality of production cells that are in the form of pseudo profit center and formed as groups, production lines or regions according to the actual requirements. The present invention further installs a cell controller on each of the production cells, so that each of the production cells can perform most of the functions originally existing in the conventional MES (except the functions of scheduling, calculation of gross production efficiency, etc.), thereby effectively lifting the limits of the centralized management system to overcome the shortcomings of the centralized MES. Furthermore, each of the production cells can collect and disclose the production information according to its characteristics, thereby attaining the optimum adjustment and efficacy.

Figure 3:
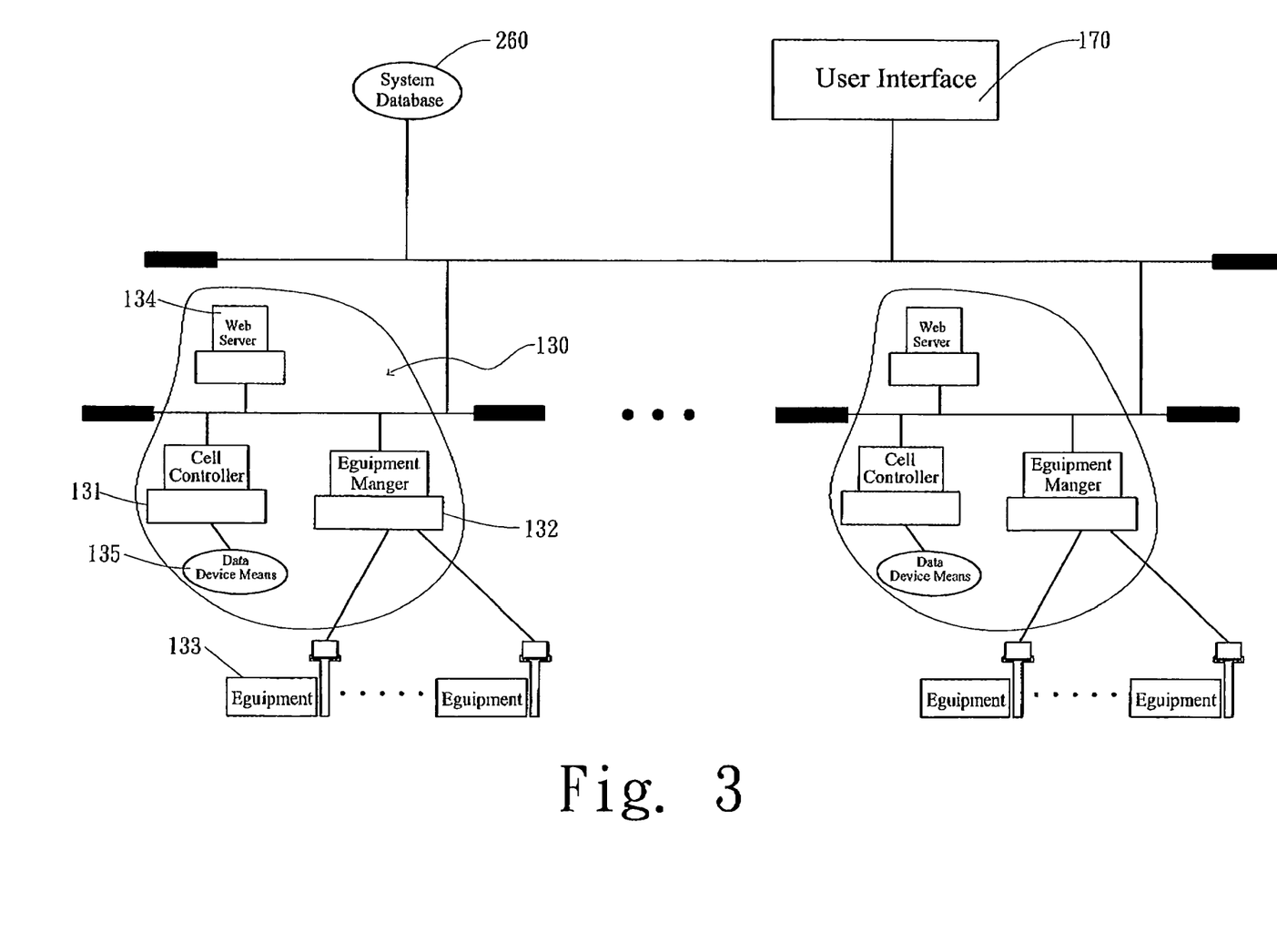
FIG. 3 is a schematic diagram showing the operation of a production cell information system based on activity costs, according to the present invention.
Figure 4:
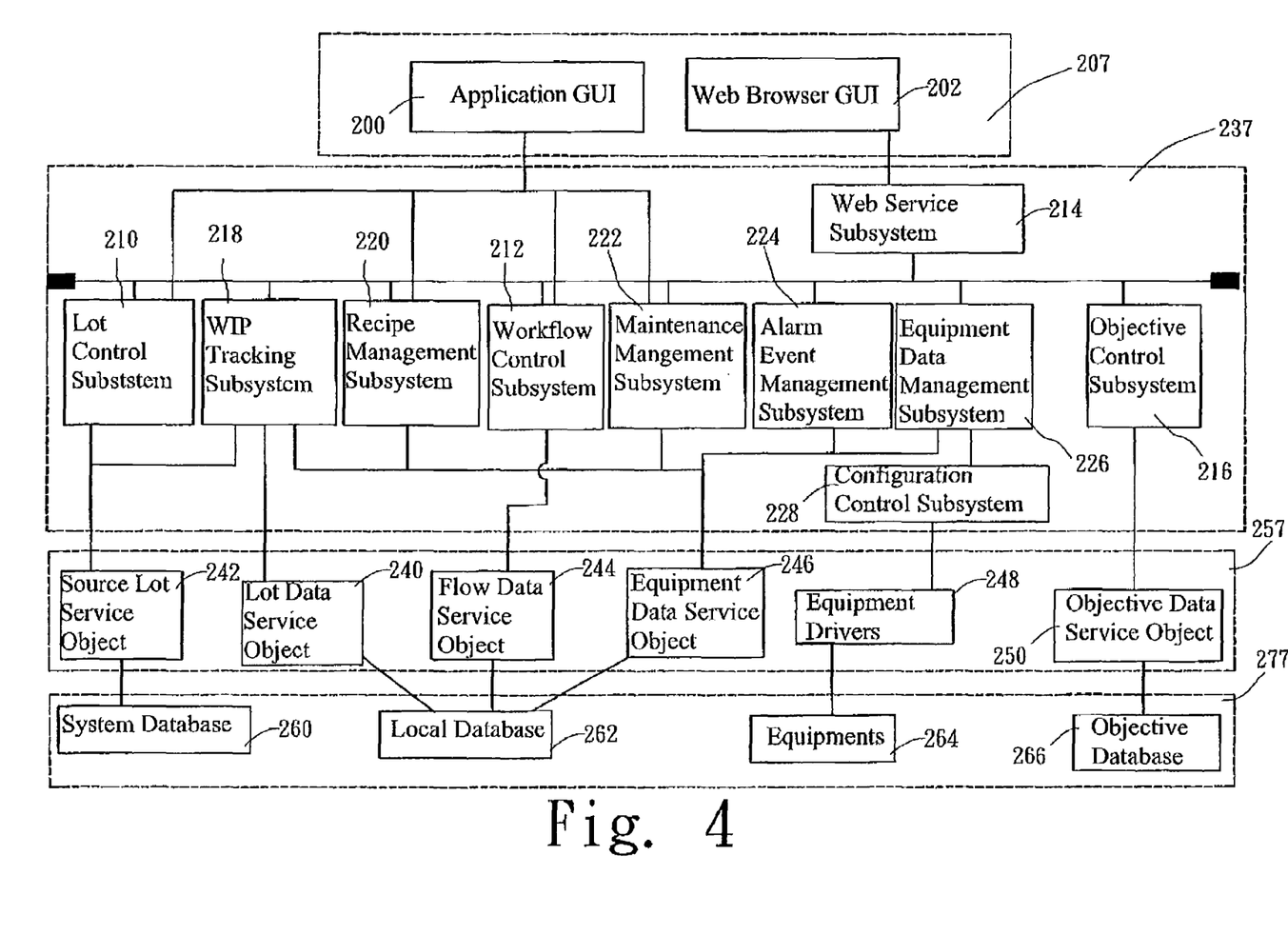
FIG. 4 is a schematic diagram showing an architecture for a production cell information system based on activity costs, according to the present invention.

Referring to FIG. 3 and FIG. 4, FIG. 3 is a schematic diagram showing the operation of a production cell information system based on activity costs, according to the present invention, and FIG. 4 is a schematic diagram showing an architecture for a production cell information system based on activity costs, according to the present invention. A production cell information system 130 of the present invention based on activity costs comprises: a cell controller 131, an equipment manger 132, a data service means 135 and a web server 134. The cell controller 131 further comprises: a lot control subsystem 210, a workflow control subsystem 212, an objective control subsystem 216, a WIP tracking subsystem 218, an equipment data management subsystem 226, a recipe management subsystem 220, an alarm event management subsystem 224 and a maintenance management subsystem 222. The equipment manager 132 further comprises: a configuration control subsystem 228 and a plurality of equipment drivers 248. The data service means 135 further comprises: a local database 262 and an objective database 266. The web server 134 further comprises a web service subsystem 214.

Please refer to FIG. 3 continuously. Most of the functions existing in the conventional MES are performed in the cell controller 131, and the commands are issued through the equipment manager 132 to a plurality of equipments 133. The production in the entire factory can be controlled and monitored merely by a factory manager (not shown) through a user interface 170. A system database 260 is used for storing the complete production information of a production cell. Since the workload on the equipment management is greatly reduced, the present invention of the production cell information system based on activity costs can overcome the shortcomings of the centralized MES.

Please refer to FIG. 4 continuously. According to the present invention, an architecture for the production cell information system based on activity costs adopts a multi-layer architecture, wherein the architecture comprises: a presentation layer 207, a business rules layer 237, a data object service layer 257 and an entity layer 277. The presentation layer 207 provides two kinds of user interfaces, and the user interface comprises one application GUI (Graphic User Interface) 200 located on one end of the production cell, and one browser GUI 202, wherein the former can be used for satisfying the demands from the real-time applications located in the production cell connected in a local area network, and the latter for satisfying the demands from remote users who desire to inquire or browse the on-site status of the production cell.

Please refer to FIG. 4 continuously. The business rules layer 237 is mainly used for handling various business rules inside an enterprise, and comprises: a lot control subsystem 210 for tracking and recording the actual procedure and progress for each lot inside the production cell; a workflow control subsystem 212, which is a handling center responsible for verifying and controlling the material flow by expected flow inside the production cell; a web service subsystem 214 for providing services between the browser GUI 202 and the application subsystems in business rules layer 237, and also providing functions of safety and duty verification; an objective control subsystem 216 for defining indicators, drivers and activities under objectives by resources, and collecting the cost information of activities; a WIP tracking subsystem 218 for first dividing lots into traceable units, and thereafter recording the history and status of each traceable unit; a recipe management subsystem 220 for recording and administering the product-corresponding recipes for associated equipment; a maintenance management subsystem 222 for recording the operation history of each equipment and reporting its maintenance needs; an alarm event management subsystem 224 for managing the alarm messages with regard to equipments, systems, processes and databases, thereby doing the corresponding treatments and duly responses; an equipment data management subsystem 226 for administering and passing the information collected from the equipments, such as events, commands, alarms, status and characteristics, etc.; and a configuration control subsystem 228 for controlling a plurality of equipments 264 through the equipment drivers 248 which monitor the behavior of each of the equipments 264 one-to-one. All the subsystems in the business rules layer 237 are connected through Ethernet. The number and functions of the aforementioned subsystems are merely stated as an example for explanation, and will be different on accordance with the actual requirements when the present invention is enabled, so that the present invention is not limited thereto.

Please refer to FIG. 4, continuously. The data object service layer 257 is mainly used for handling the transient data passed from the data objects in the business rules layer 237, and mainly utilizes DRAM (Dynamic Random Access Memory) to speed up the treatment of large amount of information. The data object service layer 257 comprises: a lot data service object 240 for storing the dynamic data of each lot in processes; a source lot service object 242 for recording the original information of each lot; a flow data service object 244 for describing the itemized information of the lots moving in processes; an equipment data service object 246 for temporarily storing the current status of each of the equipments 264; the equipment drivers 248 for providing an interface with each of the equipments 264 for activating different motions; and an objective data service object 250 for recording the data regarding the indicators and drivers under various objectives.

Please refer to FIG. 4 continuously. The entity layer 277 has the physical equipments 264 and the physical databases used for storing the long-term records, and the physical databases comprise: a system database 260 for storing the complete production data for the production cell, such as the data from the source lot service object 242; a local database 262 for recording the equipment-related data of medium or short term, wherein, those data are not older than three months in general, such as the data from the lot data service object 240, the flow data service object 244 or the equipment data service object 246; and an objective database 266 for collecting the objective data of the production cell from the beginning of operation, thereby cross-checking and analyzing the variance of each indicator under the objectives, such as the data from the objective service object 250.

Figure 5:
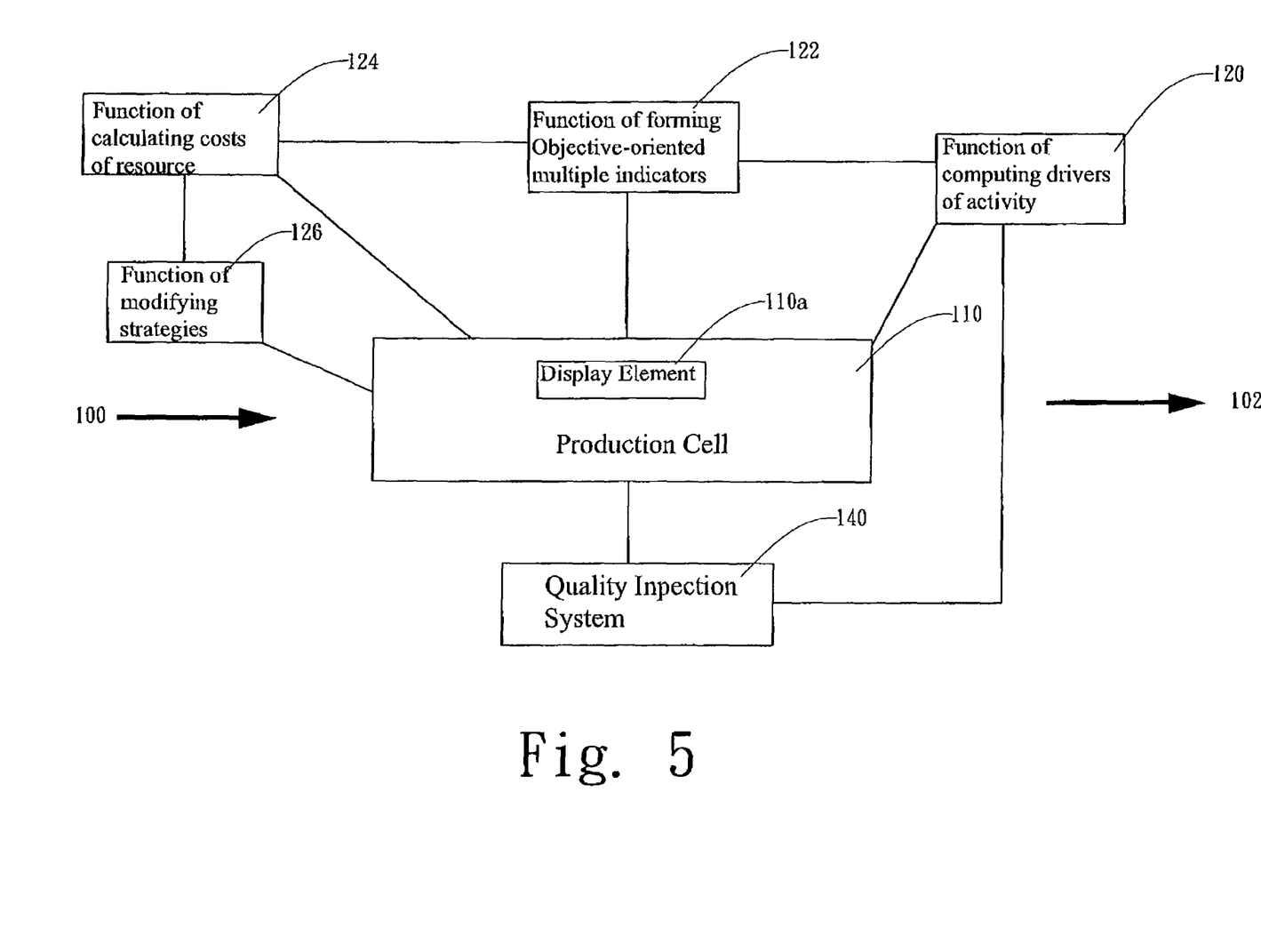
FIG. 5 is a schematic diagram showing the relationship with regard to material flow and information flow in the production cell information system based on activity costs, according to the present invention.

On the other hand, one of the major features of the present invention is to perform a cost evaluation on each production cell, wherein the activity costs of production line are used as a base for computing the multiple indicators, so that the production strategies can be modified in time, thereby promoting the production capacity and yield. Referring FIG. 5, FIG. 5 is a schematic diagram showing the relationship with regard to material flow and information flow in the production cell information system based on activity costs, according to the present invention. In comparison with FIG. 2, all the elements/functions shown in FIG. 5 are integrated and executed within a production cell information system. A production cell 110 has a built-in display element 110a, so that the production information not only can be sent to a quality inspection system 140 by regular periods or by triggered events, but also can be provided to the onsite or direct personnel in real-time mode. The production cell 110 sends the pre-defined characteristics to function 120 of computing drivers of activity, so as to compute various production activities and the constituents and relationship among the driving factors regarding these activities, wherein the so-called activities comprises the operation targets related to equipments, such as production activity, engineering adjustment activity and timely maintenance activity, etc. After function 122 of forming objective-oriented multiple indicators receives the computed drivers, the drivers are converted to numerical indicators that are quantitatively accessible according to the pre-defined formulae and relationships among constituents. Thereafter, function 124 of calculating costs of resource adds the consideration and calculation of costs to the results of indicators, so as to estimate the costs and efficacy of the activities related to each resource. Then, function 126 of modifying strategies receives the results generated from function 124 of calculating costs of resource, and then adjusts or modifies the elements of production procedure including the production factors, such as process parameters, scheduling principles and maintenance management, etc.

Please refer to FIG. 5 continuously. The display element 110*a* contained in the production cell 110 is provided for browsing each of the indicators and the cost efficacy, so that the results from function 122 of forming objective-oriented multiple indicators can be viewed by means of various statistical charts or tables, and the results from function 124 of calculating costs of resource can also be displayed. The production cell 110 can be formed by grouping the equipments, according to the actual production situations. The grouping method basically is to classify and assemble the equipments which have similar designs or processes, thereby effectively increasing manufacturing efficiency about the factors, such as setup time, number of WIP, scheduling, tool control and planning of standardized process, etc. In the real-world planning, the production equipments can be arranged in equipment groups or production cells, or can be arranged in series to from a production line according to the process sequence, thereby putting the related processes together for effectively controlling the time factors of manufacture, such as moving and transporting time, queuing time, number of WIP, etc.

Please refer to FIG. 5 continuously. The function 124 for calculating costs of resource also takes the cost of personnel arrangement into full consideration. The personnel arrangement includes the arrangements of direct personnel (such as operators and on-site supervisors, etc.), indirect personnel (such as process engineers and quality assurance engineers, etc.), and management personnel (such as managers, etc.), wherein the direct personnel is involved full-time in a production cell, and the indirect and management personnel are involved part-time or at intervals in a production cell. Hence, for calculating the actual cost of goods sold, both the activity drivers and the activity varieties and time in which personnel is involved, have to be effectively collected and calculated, so as to reflect the actual cost. It is deserved to be mentioned that the so-called resource includes the targets from equipments, personnel, products, and processes, wherein the cost calculations of resource are different due to different targets of resource. For example, to calculate the cost of equipments, besides the depreciation listed in the asset indication, the actual product price also has to be taken into account. To calculate the cost of personnel, the records of events and operation history based on actual activities are crosschecked and analyzed to obtain the actual time consumed in each of the activities, and the related information is also collected according to the possible essential factors (i.e. drivers of activity). With regard to the target of product, it is stressed on collecting the specific time factors and quality factors of product, wherein the specific time factors comprises production cycle time, configuration time of equipments with regard to the product, and engineering time. The quality factors are such as yield, reworking ratio and scrapping ratio, etc. Further, the factors such as material, WIP and inventory amount, all are important in the cost consideration. Hence, for the sake of final net profit, every cost of resource has to be actually calculated so as to effectively reflect the actual situations.

To sum up, the production cell 110 is responsible for the production-related affairs. Although the production cell 110 does not have any authority for making the decision of price and sales, yet it can still be quite independent in the areas from resource allocation, activity arrangement, to production strategies, it thus can be considered as a pseudo profit center. Within the pseudo profit center, the objectives are based on the costs of activity and resource, and all the feedback information is based on these objectives as ultimate guidelines, and the modification of strategies are also based on the principle that the cost efficacy can be consistently increased, whereby the adjustment and improvement are made inside the production cell. Hence, the step of cost evaluation of the present invention is to fully integrate a cost system, an efficacy evaluation information system and a workflow management, thereby improving the on-site efficacy, and further enhancing the growth and profitability of an enterprise.

Figure 6:
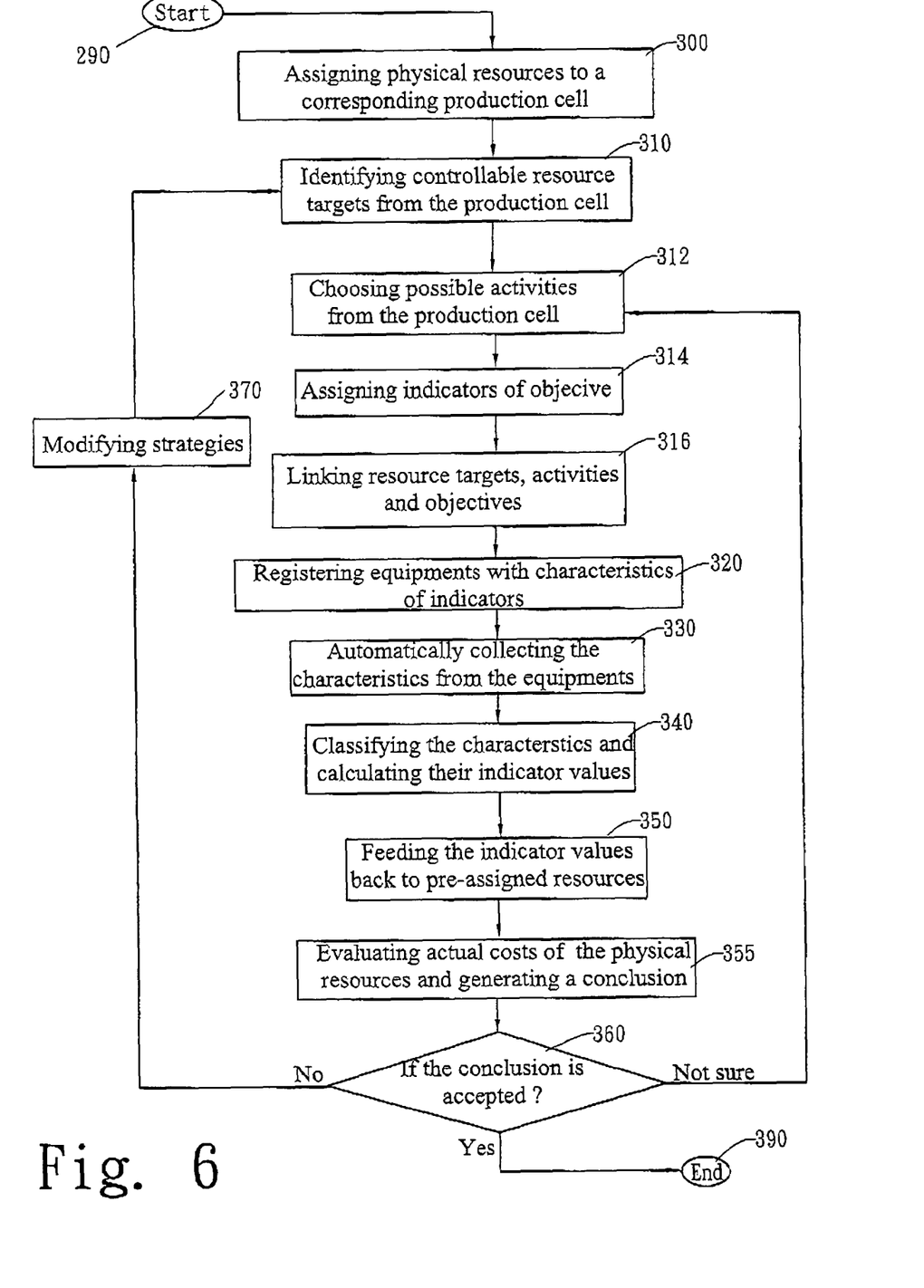
FIG. 6 is a schematic diagram showing the flow chart of the cost evaluation, according to the present invention.

In a preferred embodiment of the present invention, the aforementioned feature is mainly performed in the objective control subsystem 216 as shown in FIG. 4, but the present invention is not limited thereto. Referring to FIG. 6, FIG. 6 is a schematic diagram showing the flow chart of the cost evaluation, according to the present invention. The description about the flow chart is stated hereinafter. First, step 290 is performed to start a cost evaluation. In the assigning stage, step 300 is performed by users for assigning physical resources to a corresponding production cell, according to the arrangement of on-site facilities, wherein the physical resources comprises labors, equipments and processes, etc. Thereafter, step 310 is performed for identifying controllable resource targets from the production cell, and the resource targets comprises products, equipments, production lines, processes, activities and clients. Further, the purchasing cost or basic cost involved in each resource target also needs to be determined and set. Then, step 312 is performed for choosing possible activities from the production cell, so as to build the mapping drivers and views. Thereafter, step 314 is performed for assigning indicators of objective, thereby configuring the core items and formulae of indicators. After step 316 is performed for linking resource targets, activities and objectives while in setup, then the result is stored in a database and monitored by the objective control subsystem.

Please refer to FIG. 6 continuously. In the collecting and computing stage, when equipments and personnel are in the controlled status ready for production, step 320 is performed for registering equipments with characteristics of indicators. Thereafter, when the activities have been executed, step 330 is performed for automatically collecting the characteristics from the equipments. Then, according to the attributes corresponding to the characteristics, step 340 is performed for classifying the characteristics and calculating their indicator values. Then, step 350 is performed for feeding the indicator values back to pre-assigned resources. After step 355 is performed for evaluating actual costs of physical resources and generating a conclusion, step 360 is performed for determining if the conclusion is accepted and generating a result. If the result of step 360 is still not sure, the procedure returns to step 312 for setting up the drivers and views again according to the activities in the production cell. If the result of step 360 is no (i.e. the conclusion of cost evaluation is not acceptable.), step 370 is performed for modifying strategies, and then the procedure returns to step 310 for identifying the resources again. If the result of step 360 is yes (i.e. the conclusion of cost evaluation is accepted.), step 390 is performed for ending the cost evaluation.

To sum up, one advantage of the present invention is to provide a production cell information system based on activity costs and an architecture therefor, wherein the production cell information system in which an equipment manager is integrated performs most of the functions originally existing in the conventional MES, thereby effectively resolving the problem of execution speed bottleneck caused by the conventional MES.

Another advantage of the present invention is to provide a production cell information system based on activity costs and an architecture therefor, wherein multiple indicators based on the activity costs are calculated right at the production line, so that the production strategies can be modified in time, thereby promoting the production capacity and yield. The present invention enables every production cell in a factory to effectively make real-time measurements about its production output. With regard to enterprise internal procedure, the present invention has the advantages of improving the time factors in the activity procedure; reducing the number of WIP; and promoting quality and yield. Furthermore, with regard to customer service, the present invention can show the ratio of on-time delivery, and with regard to finance, the present invention can evaluate the manufacturing cost and present the result in time, thus enabling the personnel on the production cell to be personally ware of the cost factors, thereby achieving the objectives of profit center.

Another advantage of the present invention is to provide a production cell information system based on activity costs and an architecture therefor, wherein every production cell is equipped with a web server, so that users at the client ends can efficiently obtain the desired production information by means of web browsers.

As is understood by a person skilled in the art, the foregoing preferred embodiments of the present invention are illustrated of the present invention rather than limiting of the present invention. It is intended to cover various modifications and similar arrangements included within the spirit and scope of the appended claims, the scope of which should be accorded the broadest interpretation so as to encompass all such modifications and similar structure.

What is claimed is:

1. A production cell information system performing functions based on activity costs, wherein a factory is divided into a plurality of production cells, and the production in said factory is controlled and monitored merely by a factory manager through a user interface, and each of said production cells includes said production cell information system used for controlling a plurality of equipments belonging thereto, said production cell information system comprising:

a cell controller used for executing at least one function originally existing in a MES (Manufacturing Execution system), and a cost evaluation, wherein said MES alone is originally used to controlling all the equipments currently belonging to said production cells, said cost evaluation further comprising:

starting said cost evaluation;

assigning a plurality of physical resources to said production cell;

identifying a plurality of controllable resource targets from said production cell;

choosing a plurality of possible activities from said production cell;

assigning a plurality of indicators under a plurality of objectives;

linking said plurality of controllable resource targets, said plurality of possible activities and said plurality of objectives;

registering said plurality of equipments with a plurality of characteristics, wherein said plurality of characteristics are obtained from said plurality of indicators;

automatically collecting said plurality of characteristics from said plurality of equipments;

classifying said plurality of characteristics and calculating a plurality of indicator values of said plurality of characteristics;

feeding said plurality of indicator values back to said plurality of physical resources pre-assigned;

evaluating the actual costs of said plurality of physical resources, and generating a conclusion reflecting the cost and efficacy of said each of said production cells;

determining if said conclusion has achieved the objectives of said each of said production cells, wherein if said conclusion is not sure about whether the objective of said each of said production cells have been achieved, returning to said step of choosing said plurality of possible activities from said production cell;

modifying a plurality of strategies, wherein if said conclusion indicates that the objectives of said each of said production cells have not been achieved, first returning to said step of modifying said plurality of strategies, then returning to said step of identifying said plurality of controllable resource targets from said production cell; and ending said cost evaluation, wherein if said conclusion indicates that the objectives of said each of said production cells have been achieved, performing said step of ending said cost evaluation;

an equipment manager, wherein said equipment manager further comprises: a configuration control subsystem and a plurality of equipment drivers;

a data service means, wherein said data service means further comprises: a local database and an objective database; and a web server, wherein said web server further comprises a web service subsystem.

2. The production cell information system of claim 1, wherein said cell controller further comprises:

a lot control subsystem, wherein said lot control subsystem is used for tracking and controlling the expected and actual procedures and progress for a plurality of lots inside said production cell;

a workflow control subsystem, wherein said workflow control subsystem is a handling center responsible for verifying and controlling the material flow by expected flow inside the production cell;

an objective control subsystem, wherein said objective control subsystem is used for defining a plurality of indicators and a plurality of drivers under a plurality of objectives;

a WIP (Work In Process) subsystem, wherein said WIP subsystem is used for dividing said plurality of lots into a plurality of units, thereby recording the history and status of each of said plurality of units;

a recipe management subsystem, wherein said recipe management subsystem is used for recording and managing a plurality of recipes corresponding to said plurality of equipments;

a maintenance management subsystem, wherein said maintenance management subsystem is responsible for recording an operation history of each of said plurality of equipments;

an alarm event management subsystem; and an equipment data management subsystem, wherein said equipment data management subsystem is used for distributing a plurality of items collected from said plurality of equipments, said plurality of items comprising events, alarms, statuses and characteristics.

3. The production cell information system of claim 1, wherein said data service means is connected to said cell controller.

4. The production cell information system of claim 1, wherein said local database stores the data created or modified within the past three months.

5. A production cell information system performing functions based on activity costs, wherein a factory is divided into a plurality of production cells, and the production in said factory is controlled and monitored merely by a factory manager through a user interface, and each of said production cells includes said production cell information system used for controlling a plurality of equipments belonging thereto, said production cell information system comprising:

a cell controller used for executing a plurality of functions originally existing in a MES (Manufacturing Execution system), and a cost evaluation, wherein said MES alone is originally used to controlling all the equipments currently belonging to said production cells, said cell controller further comprising:

a lot control subsystem, wherein said lot control subsystem is used for tracking and controlling the expected and actual procedures and progress for a plurality of lots inside said production cell;

a workflow control subsystem, wherein said workflow control subsystem is responsible for monitoring and controlling the situation of material flow inside said production cell;

an objective control subsystem, wherein said objective control subsystem is used for defining a plurality of indicators and a plurality of drivers under a plurality of objectives;

a WIP subsystem, wherein said WIP subsystem is used for dividing said plurality of lots into a plurality of units, thereby recording the history and status of each of said plurality of units;

a recipe management subsystem, wherein said recipe management subsystem is used for recording and managing a plurality of recipes corresponding to said plurality of equipments;

a maintenance management subsystem, wherein said maintenance management subsystem is responsible for recording an operation history of each of said plurality of equipments;

an alarm event management subsystem; and an equipment data management subsystem, wherein said equipment data management subsystem is used for distributing a plurality of items collected from said plurality of equipments, said plurality of items comprising events, alarms, statuses and characteristics;

said cost evaluation further comprising:

starting said cost evaluation;

assigning a plurality of physical resources to said production cell;

identifying a plurality of controllable resource targets from said production cell;

choosing a plurality of possible activities from said production cell;

assigning a plurality of indicators under a plurality of objectives;

linking said plurality of controllable resource targets, said plurality of possible activities and said plurality of objectives;

registering said plurality of equipments with a plurality of characteristics, wherein said plurality of characteristics are obtained from said plurality of indicators;

automatically collecting said plurality of characteristics from said plurality of equipments;

classifying said plurality of characteristics and calculating a plurality of indicator values of said plurality of characteristics;

feeding said plurality of indicator values back to said plurality of physical resources pre-assigned;

evaluating the actual costs of said physical resources, and generating a conclusion reflecting the cost and efficacy of said each of said production cells;

determining if said conclusion has achieved the objectives of said each of said production cells, wherein if said conclusion is not sure about whether the objective of said each of said production cells have been achieved, returning to said step of choosing said plurality of possible activities from said production cell;

modifying a plurality of strategies, wherein if said conclusion indicates that the objectives of said each of said production cells have not been achieved, first returning to said step of modifying said plurality of strategies, then returning to said step of identifying said plurality of controllable resource targets from said production cell; and ending said cost evaluation, wherein if said conclusion indicates that the objectives of said each of said production cells have been achieved, performing said step of ending said cost evaluation;

an equipment manager, wherein said equipment manager further comprises: a configuration control subsystem and a plurality of equipment drivers;

a data service means, wherein said data service means further comprises: a local database and an objective database; and a web server, wherein said web server further comprises a web service subsystem.

6. The production cell information system of claim 5, wherein said data service means is connected to said cell controller.

7. The production cell information system of claim 5, wherein said local database stores the data created or modified within the past three months.

8. An architecture for a production cell information system performing functions based on activity costs, wherein a factory is divided into a plurality of production cells, and the production in said factory is controlled and monitored merely by a factory manager through a user interface, and each of said production cells includes said production cell information system used for controlling a plurality of equipments belonging thereto, said architecture comprising:

a presentation layer used for providing said user interface, wherein said user interface comprises an application GUI (Graphic User Interface), and a browser GUI;

a business rules layer, wherein said business rules layer comprises:
a lot control subsystem, wherein said lot control subsystem is used for tracking and recording the actual procedure and progress for each lot inside the production cell;
a workflow control subsystem, wherein said workflow control subsystem is responsible for monitoring and controlling the situation of material flow inside said production cell;
a web service subsystem, wherein said web service subsystem is used for providing communication and service between said browser GUI and said workflow controller subsystem, and providing the function of safety and duty distribution;
an objective control subsystem, wherein said objective control subsystem is used for defining a plurality of indicators and a plurality of drivers under a plurality of objectives;
a WIP subsystem, wherein said WIP subsystem is used for dividing said plurality of lots into a plurality of units, thereby recording the history and status of each of said plurality of units;
a recipe management subsystem, wherein said recipe management subsystem is used for recording and managing a plurality of recipes corresponding to said plurality of equipments;
a maintenance management subsystem, wherein said maintenance management subsystem is responsible for recording an operation history of each of said plurality of equipments;
an alarm event management subsystem;
an equipment data management subsystem, wherein said equipment data management subsystem is used for distributing a plurality of items collected from said plurality of equipments, said plurality of items comprising events, alarms, statuses and characteristics; and
a configuration control subsystem, wherein said configuration control subsystem is used for controlling said plurality of equipments;
a data object service layer used for handling the transient data passed from a plurality of data objects in said business rules layer, wherein said data object service layer further comprises:
a lot data service object, wherein said lot data service object is used for storing the dynamic data of each of said plurality of lots;
a source lot service object, wherein said source lot service object is used for recording the original information of each of said plurality of lots;
a flow data service object, wherein said flow data service object is used for describing the itemized information of said plurality of lots moving in a plurality of processes;
an equipment data service object, wherein said equipment data service object is used for temporarily storing the current status of each of said plurality of equipments;
a plurality of equipment drivers, wherein each of said plurality of equipment drivers is used for monitoring the behavior of each of said plurality of equipments one-on-one; and
an objective data service object, wherein said object data service object is used for recording the data regarding said plurality of indicators and said plurality of drivers under said plurality of objectives so as to execute a cost evaluation, said cost evaluation further comprising:
starting said cost evaluation;
assigning a plurality of physical resources to said production cell;
identifying a plurality of controllable resource targets from said production cell;
choosing a plurality of possible activities from said production cell;
assigning a plurality of indicators under a plurality of objectives;
linking said plurality of controllable resource targets, said plurality of possible activities and said plurality of objectives;
registering said plurality of equipments with a plurality of characteristics, wherein said plurality of characteristics are obtained from said plurality of indicators;
automatically collecting said plurality of characteristics from said plurality of equipments;
classifying said plurality of characteristics and calculating a plurality of indicator values of said plurality of characteristics;
feeding said plurality of indicator values back to said plurality of physical resources pre-assigned;
evaluating the actual costs of said physical resources, and generating a conclusion reflecting the cost and efficacy of said each of said production cells;
determining if said conclusion has achieved the objectives of said each of said production cells, wherein if said conclusion is not sure about whether the objective of said each of said production cells have been achieved, returning to said step of choosing said possible activities from said production cell;
modifying a plurality of strategies, wherein if said conclusion indicates that the objectives of said each of said production cells have been achieved, first returning to said step of modifying said of plurality strategies, then returning to said step of identifying said plurality of controllable resource targets from said production cell; and
ending said cost evaluation, wherein if said conclusion indicates that the objectives of said each of said production cells have been achieved, performing said step of ending said cost evaluation; and
an entity layer, wherein said entity layer comprises:
a system database, wherein said system database is used for storing complete production data for said production cell;
a local database, wherein said local database is used for recordingdata related to said plurality of equipments; and
an objective database, wherein said objective database is used for collecting objective data of said production cell from the beginning of operation.

9. The architecture for said production cell information system of claim 8, wherein data in said source lot service object is stored in said system database; data in said lot data service object, that in said flow data service object and that in said equipment data service object being stored in said local database; data in said objective data service object being stored in said objective database.

10. The architecture for said production cell information system of claim 8, wherein said subsystems in said business rules layer are connected to a cell controller.

11. The architecture for said production cell information system of claim 8, wherein said data object service layer utilizes DRAM (Dynamic Random Access Memory) to speed up the treatment of large amount of information.

12. The architecture for said production cell information system of claim 8, wherein said local database stores said data created or modified within the past three months.

* * * * *